United States Patent
Kusaki et al.

(10) Patent No.: US 11,640,425 B2
(45) Date of Patent: May 2, 2023

(54) INSPECTION SUPPORT SYSTEM FOR CONSTRUCTION MACHINE, MANAGEMENT SERVER, AND INSPECTION REPORT CREATION SYSTEM

(71) Applicant: HITACHI CONSTRUCTION MACHINERY CO., LTD., Tokyo (JP)

(72) Inventors: Takami Kusaki, Kasumigaura (JP); Tomohiro Yoshida, Matsudo (JP); Masutaka Kumasaka, Toride (JP); Kazuo Fujishima, Tsuchiura (JP); Satoshi Inose, Tsukuba (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 16/328,776

(22) PCT Filed: Sep. 29, 2017

(86) PCT No.: PCT/JP2017/035716
§ 371 (c)(1),
(2) Date: Feb. 27, 2019

(87) PCT Pub. No.: WO2019/064581
PCT Pub. Date: Apr. 4, 2019

(65) Prior Publication Data
US 2020/0142923 A1 May 7, 2020

(51) Int. Cl.
*G06Q 10/00* (2012.01)
*G07C 5/00* (2006.01)
(Continued)

(52) U.S. Cl.
CPC ............ *G06F 16/54* (2019.01); *G06F 16/538* (2019.01); *G06F 16/5866* (2019.01);
(Continued)

(58) Field of Classification Search
CPC .... G06F 16/54; G06F 16/5866; G06F 16/538; G06F 3/0481; G06Q 10/06313;
(Continued)

(56) References Cited

U.S. PATENT DOCUMENTS 10,089,396 B2 * 10/2018 Endras .................. G06F 40/174
10,214,364 B2 * 2/2019 Grathwol ............... B65G 43/08
(Continued)

FOREIGN PATENT DOCUMENTS

JP 2003-27530 A 1/2003
JP 2015-124514 A 7/2015
(Continued)

*Primary Examiner* — Kieu D Vu
*Assistant Examiner* — Blaine T Basom
(74) *Attorney, Agent, or Firm* — Mattingly & Malur, PC

(57) ABSTRACT

An inspection support system for a construction machine including a camera 416 and a display (monitor) 414 and acquiring image data of the construction machine provided in an inspection report includes a guidance display section 432 that displays a guidance image on the display 414, the guidance image showing a composition of a photographing object photographed as the image data, a photographing section 450 that acquires a photographic subject image photographed by the camera 416 as image data, and a transmitting section that transmits the image data acquired to a management server 300 that manages the inspection report.

6 Claims, 15 Drawing Sheets

(51) Int. Cl.
*G07C 5/08* (2006.01)
*G06F 16/54* (2019.01)
*G06F 16/538* (2019.01)
*G06F 16/58* (2019.01)
*G06Q 10/06* (2012.01)
*G06Q 10/0631* (2023.01)
*G06Q 10/20* (2023.01)

(52) U.S. Cl.
CPC ....... *G06Q 10/06313* (2013.01); *G06Q 10/20* (2013.01); *G07C 5/008* (2013.01); *G07C 5/08* (2013.01)

(58) Field of Classification Search
CPC ........ G06Q 10/20; G06Q 10/00; G06Q 50/10; G06Q 10/10; G06Q 50/08; E02F 9/20; G08B 25/04; G08B 25/10; G07C 5/00; G07C 5/002; G07C 5/004; G07C 5/006; G07C 5/008; G07C 5/02; G07C 5/04; G07C 5/06; G07C 5/08; G07C 5/0808; G07C 5/0816; G07C 5/0825; G07C 5/0833; G07C 5/0841; G07C 5/085; G07C 5/0858; G07C 5/0866; G07C 5/0875; G07C 5/0883; G07C 5/0891; G07C 5/10; G07C 5/12
See application file for complete search history.

(56) References Cited

U.S. PATENT DOCUMENTS

| | | | | |
|---|---|---|---|---|
| 10,685,400 | B1* | 6/2020 | Brandmaier | G06Q 40/08 |
| 10,692,050 | B2* | 6/2020 | Taliwal | G06K 9/4671 |
| 2002/0198637 | A1* | 12/2002 | Shibata | G01M 17/007 |
| | | | | 701/31.4 |
| 2003/0163233 | A1* | 8/2003 | Song | G07C 5/085 |
| | | | | 701/31.4 |
| 2008/0208609 | A1* | 8/2008 | Preece | G06Q 10/06 |
| | | | | 705/1.1 |
| 2012/0185260 | A1* | 7/2012 | Perez | G06Q 10/087 |
| | | | | 705/1.1 |
| 2013/0262497 | A1* | 10/2013 | Case | H04L 67/42 |
| | | | | 707/758 |
| 2014/0313334 | A1* | 10/2014 | Slotky | G01N 21/9515 |
| | | | | 348/148 |
| 2014/0316998 | A1* | 10/2014 | Apostolides | G06Q 10/20 |
| | | | | 705/305 |
| 2017/0116792 | A1 | 4/2017 | Jelinek et al. | |
| 2018/0025392 | A1* | 1/2018 | Helstab | G06Q 10/06 |
| | | | | 705/306 |
| 2019/0156118 | A1* | 5/2019 | Saida | G06Q 10/20 |
| 2019/0391183 | A1* | 12/2019 | Cole | G01R 31/62 |

FOREIGN PATENT DOCUMENTS

| | | |
|---|---|---|
| JP | 2016-53531 A | 4/2016 |
| WO | 02/11007 A1 | 2/2002 |
| WO | 2016/137016 A1 | 9/2016 |

\* cited by examiner

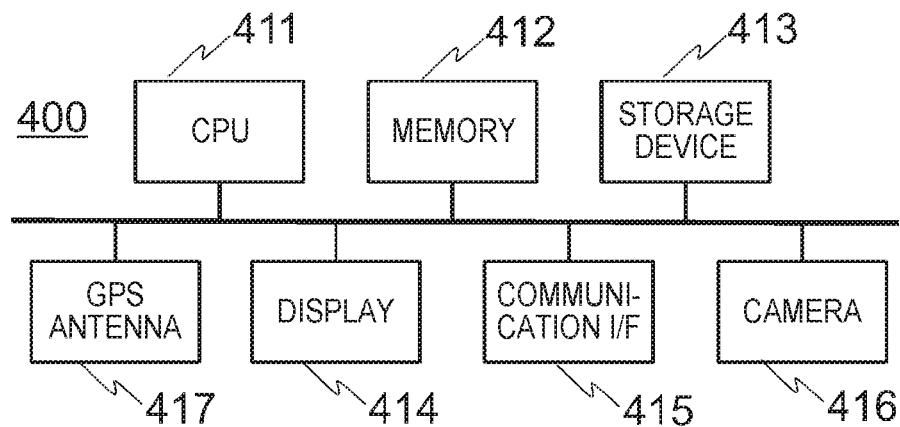
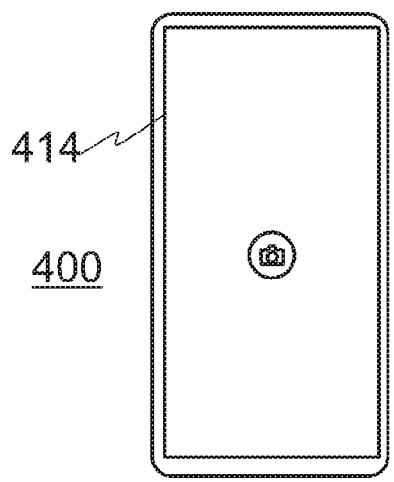
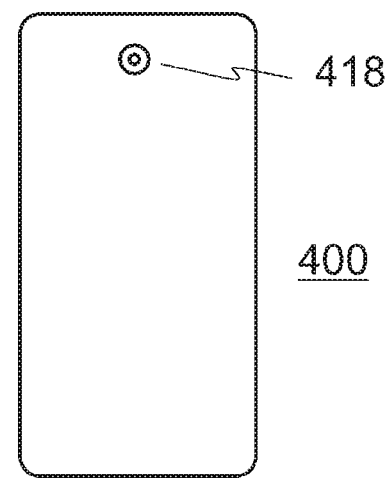
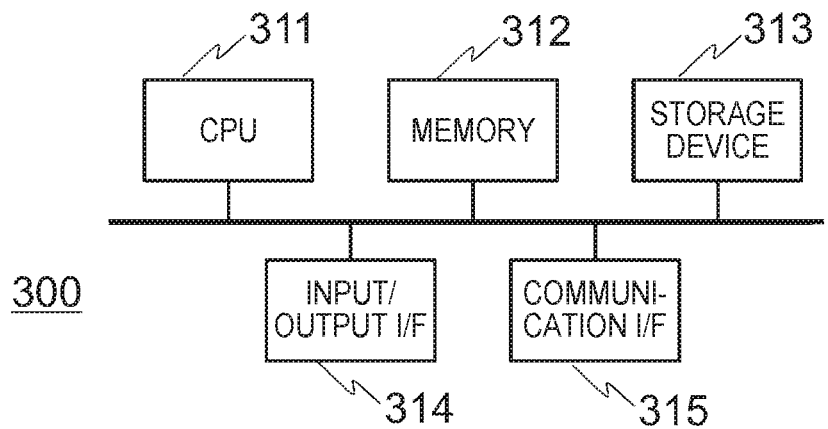

FIG. 5A

| MACHINE BODY ID 371a | TRANSMISSION TIME 371b | STATE DATA 371c | | | | |
|---|---|---|---|---|---|---|
| | | PILOT PRESSURE | PUMP PRESSURE | HYDRAULIC OIL TEMPERATURE | ENGINE ROTATIONAL SPEED | HOUR METER |

| MACHINE TYPE 375a | MODEL 375b | MACHINE SERIAL NUMBER 375c | MACHINE BODY ID 375d |
|---|---|---|---|

| CUSTOMER ID 376a | CUSTOMER NAME 376b | USING MACHINE BODY ID 376c | BUSINESS TYPE 376d |
|---|---|---|---|

| MACHINE BODY ID 377a | REPAIR DATE AND TIME 377b | REPAIR POSITION 377c | REPAIR CONTENT 377d |
|---|---|---|---|

| 478a | 478b | 478c | 478 |
|---|---|---|---|
| MACHINE TYPE | INSPECTION TYPE | PHOTOGRAPHING OBJECT NAME | |
| XXXX | PERIODIC INSPECTION | NAMEPLATE, DIAGONAL FRONT, ···, ATTACHMENT | |
| | BREAKER SPECIFICATION MACHINE INSPECTION | BREAKER PIPE,··· | |
| | INDUSTRIAL WASTE HANDLING MACHINE INSPECTION | AROUND RADIATOR,··· | |
| | PUMP ABNORMALITY | SENSOR SECTION,··· | |
| | HYDRAULIC OIL/WATER TEMPERATURE ABNORMALITY | AROUND RADIATOR,··· | |
| | ATTACHMENT ABNORMALITY | AROUND ATTACHMENT, ENLARGEMENT, | |
| | TRAVEL BELT ABNORMALITY | AROUND TRAVEL BELT/ AROUND BASE CARRIER ENLARGEMENT,··· | |

FIG. 6B

| 479a | 479b | 479 |
|---|---|---|
| PORTION/STATE DATA | INSPECTION TYPE | |
| PUMP DISCHARGE PRESSURE | PUMP ABNORMALITY | |
| HYDRAULIC OIL, WATER TEMPERATURE | RADIATOR ABNORMALITY | |
| ATTACHMENT | ATTACHMENT ABNORMALITY | |

FIG. 6C

| 380a | 380b | 380 |
|---|---|---|
| ANALYSIS RESULT | INSPECTION TYPE | |
| ATTACHMENT BREAKAGE | ATTACHMENT ABNORMALITY | |
| TRAVEL BELT DEFORMATION | TRAVEL BELT ABNORMALITY | |
| | | |

FIG. 7

| MACHINE TYPE | PHOTOGRAPHING OBJECT NAME | GUIDANCE IMAGE | COMMENT TYPE |
|---|---|---|---|
| | NAMEPLATE | | GOOD/ WITH DIRTY |
| | DIAGONAL FRONT | | GOOD/ WITH SCAR |
| | DIAGONAL REAR | | GOOD/ WITH SCAR |
| | HOUR METER | | |
| | ENGINE | | |
| | UPPERSTRUCTURE | | |
| x x x | UNDERCARRIAGE | | . . . |
| | BASE CARRIER | | |
| | FRONT | | |
| | . . . | | |
| | ATTACHMENT | | GOOD/WITH WEAR/WITH BREAKAGE |
| | . . . | | . . . |

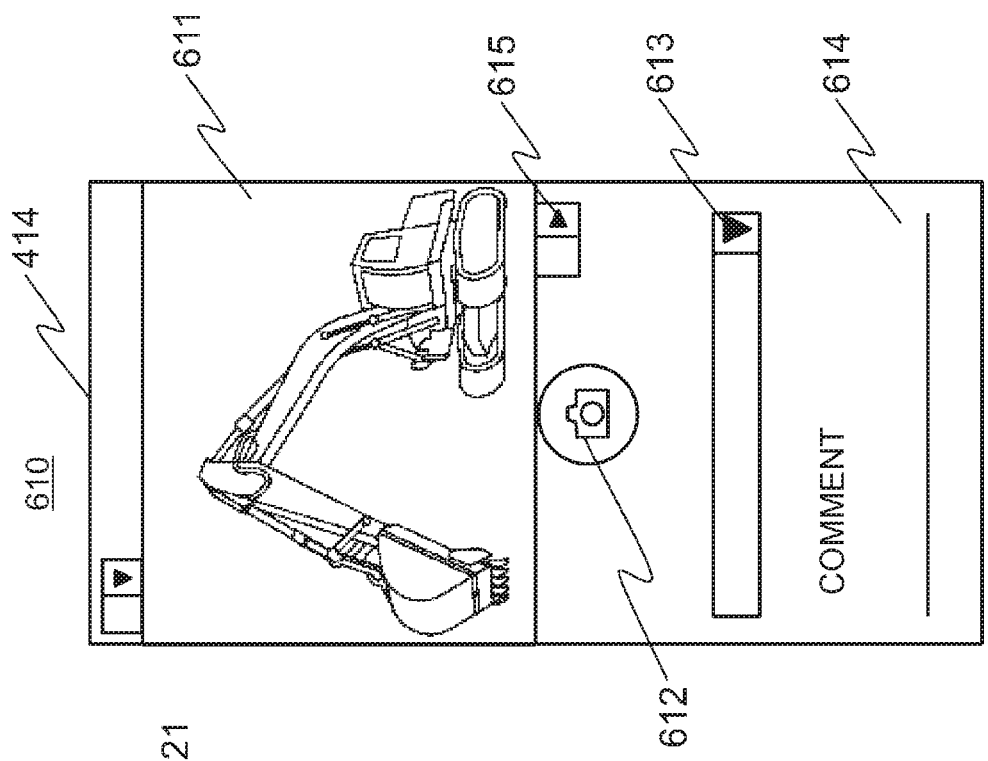
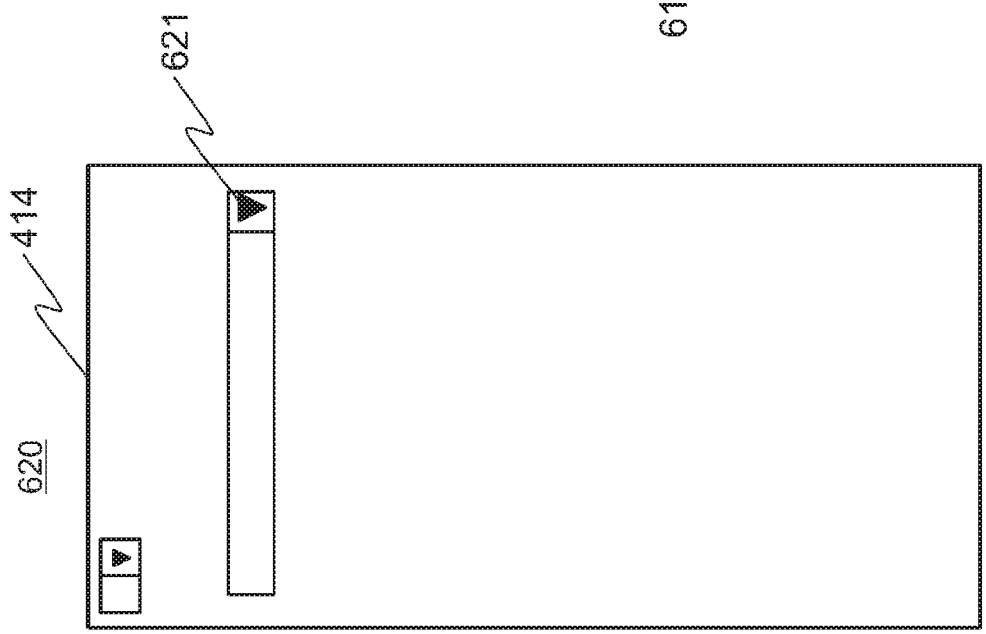

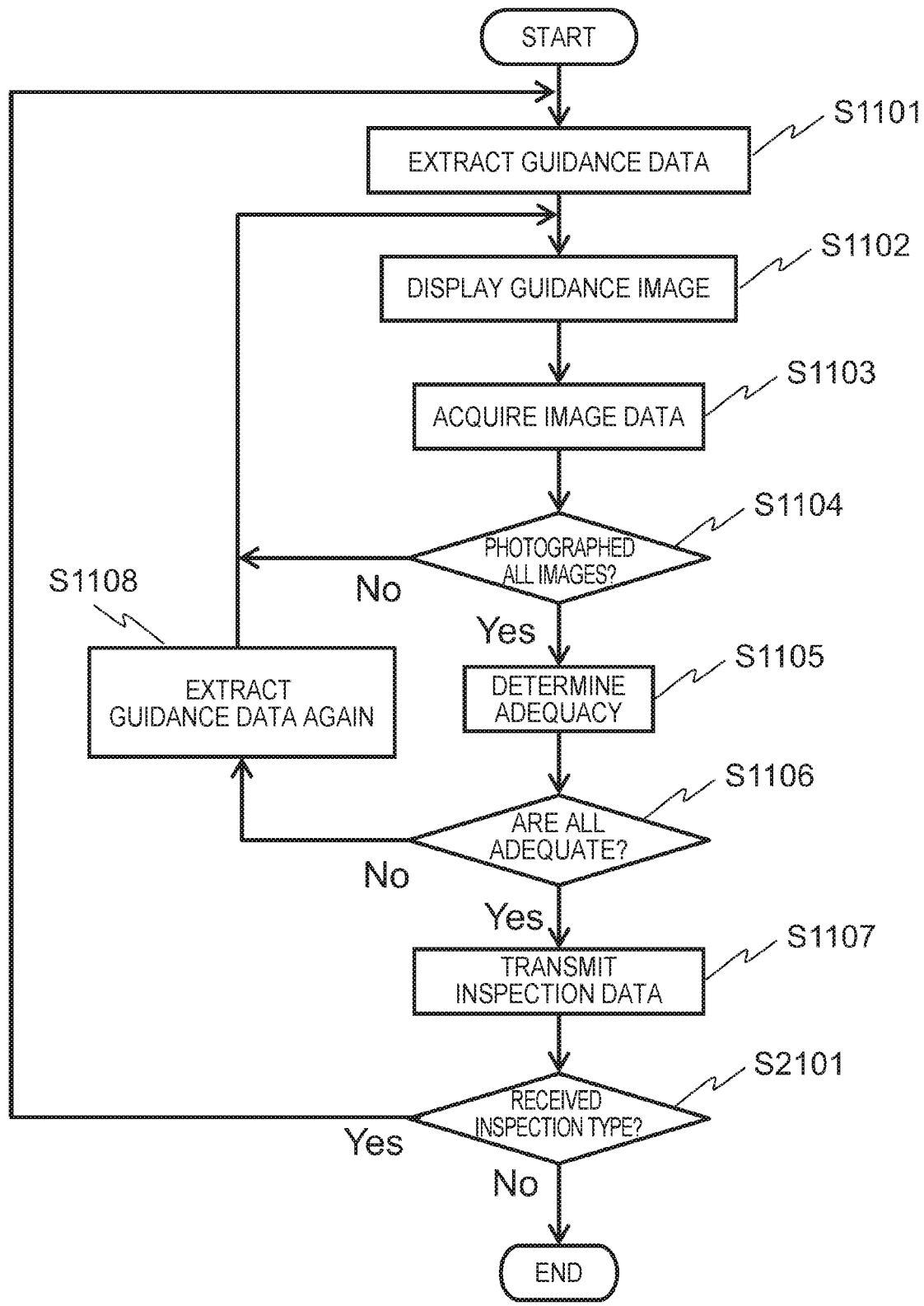

INSPECTION SUPPORT SYSTEM FOR CONSTRUCTION MACHINE, MANAGEMENT SERVER, AND INSPECTION REPORT CREATION SYSTEM

TECHNICAL FIELD

The present invention relates to a technology for creating an inspection report of a construction machine, and relates specifically to a technology for collecting data for creating an inspection report and supporting an inspection.

BACKGROUND ART

With respect to the construction machine such as a hydraulic excavator, there is a management system for managing the operation status. According to this management system, a service report is created using the operation information transmitted from the construction machine on a daily basis, and the inspection result at site by a service person.

Also, in the management system of the construction machine, there is a technology for utilizing a portable terminal. For example, in Patent Literature 1, there is disclosed "The construction machine is provided with a control device and a management center is provided with one or a plurality of terminals, a portable terminal, and a server which constructs a communication network via the Internet. If a GPS detects that the construction machine has moved out of its operating range, the server determines that the construction machine has been stolen and reports it to all the terminals and all the portable terminals constituting the communication network (an excerpt from Abstract)."

CITATION LIST

Patent Literature

Patent Literature 1: JP-A No. 2003-027530

SUMMARY OF INVENTION

Technical Problem

The service report is used not only for simply reporting the operation status of the construction machine but also for a proposal of maintenance and repair for the customer, a proposal of preventive maintenance, and so on. Therefore, the accuracy and the quality of the data that become the base are important. Particularly, an inspection report obtained by actually traveling to the site, inspecting the construction machine, and summarizing the results becomes an important basis for enhancing the power of conviction of the suggestion type service.

However, since the data becoming the base of the inspection report are collected by a service person having traveled to the site, the data are liable to depend on competence and experience of the service person. Therefore, with respect also to the inspection report created based on such data, a constant quality has not necessarily been secured.

The present invention has been achieved in view of the circumstances described above, and its object is to provide a technology for supporting an inspection and supporting creation of an inspection report having a stable quality without depending on competence and experience of a service person and without increasing creation man-hours.

Solution to Problem

The present invention provides an inspection support system for a construction machine including a camera and a monitor and acquiring image data of the construction machine provided in an inspection report, including a guidance display section that displays a guidance image on the monitor, the guidance image showing a composition of a photographing object photographed as the image data, a photographing section that acquires a photographic subject image photographed by the camera as image data, and a transmitting section that transmits the image data acquired to a management server that manages the inspection report.

Advantageous Effects of Invention

According to the present invention, an inspection report having a stable quality can be created without depending on competence and experience of a service person and without increasing creation man-hours. Problems, configurations, and effects other than those described above will be clarified by explanation of embodiments described below.

BRIEF DESCRIPTION OF DRAWINGS

FIG. 3A is a hardware block diagram of a portable terminal of the first embodiment, FIG. 3B and FIG. 3C are external views of the portable terminal of the first embodiment, and FIG. 3D is a hardware block diagram of a management server of the first embodiment.

FIG. 5A to FIG. 5D are explanatory drawings for explaining operation information, vehicle body information, customer data, and maintenance information of the first embodiment respectively.

FIG. 6A to FIG. 6C are explanatory drawings for explaining a photographing object database and an inspection type database of the first embodiment, and a second inspection type database of a second embodiment respectively.

FIG. 7 is an explanatory drawing for explaining a guidance database of the first embodiment.

FIG. 8A and FIG. 8B are explanatory drawings for explaining an initial guidance screen and a guidance screen of the first embodiment respectively.

FIG. 15 is a flowchart of an inspection report creation process of the second embodiment.

DESCRIPTION OF EMBODIMENTS

Hereinafter, embodiments of the present invention will be explained in detail based on the drawings. Also, in all drawings for explaining the embodiments, members having a same function are marked with a same or related reference sign, and repeated explanation for them will be omitted. Further, in embodiments described below, explanation for a same or similar portion will not be repeated in principle unless it will be required particularly.

Also, in each embodiment described below, explanation will be made exemplifying a hydraulic excavator as the construction machine. However, the construction machine of an object is not limited to a hydraulic excavator, and the present invention can be applied also to a wheel excavator and other construction machine.

First Embodiment

A first embodiment of the present invention will be explained. The present embodiment supports inspection and creation of the inspection report within the management system that manages the operation status of the construction machine. According to the present embodiment, a service person collects data for creating an inspection report at a site using a portable terminal. At this time, in order that required data can be collected completely, a guidance screen for supporting data collection is displayed on the portable terminal. In the guidance screen, a composition of indispensable image data, the type of an indispensable comment, and so on are included.

[Management System]

First, an outline of a management system 100 including an inspection report creation system of the present embodiment will be explained. The management system 100 of the present embodiment manages the operation information transmitted from the construction machine of the management object such as a hydraulic excavator 200 on a daily basis and data acquired by a service person, and executes creation of an inspection report, creation of the service report that compiles proposals of maintenance and repair, proposals of preventive maintenance, and the like.

Figure 1:
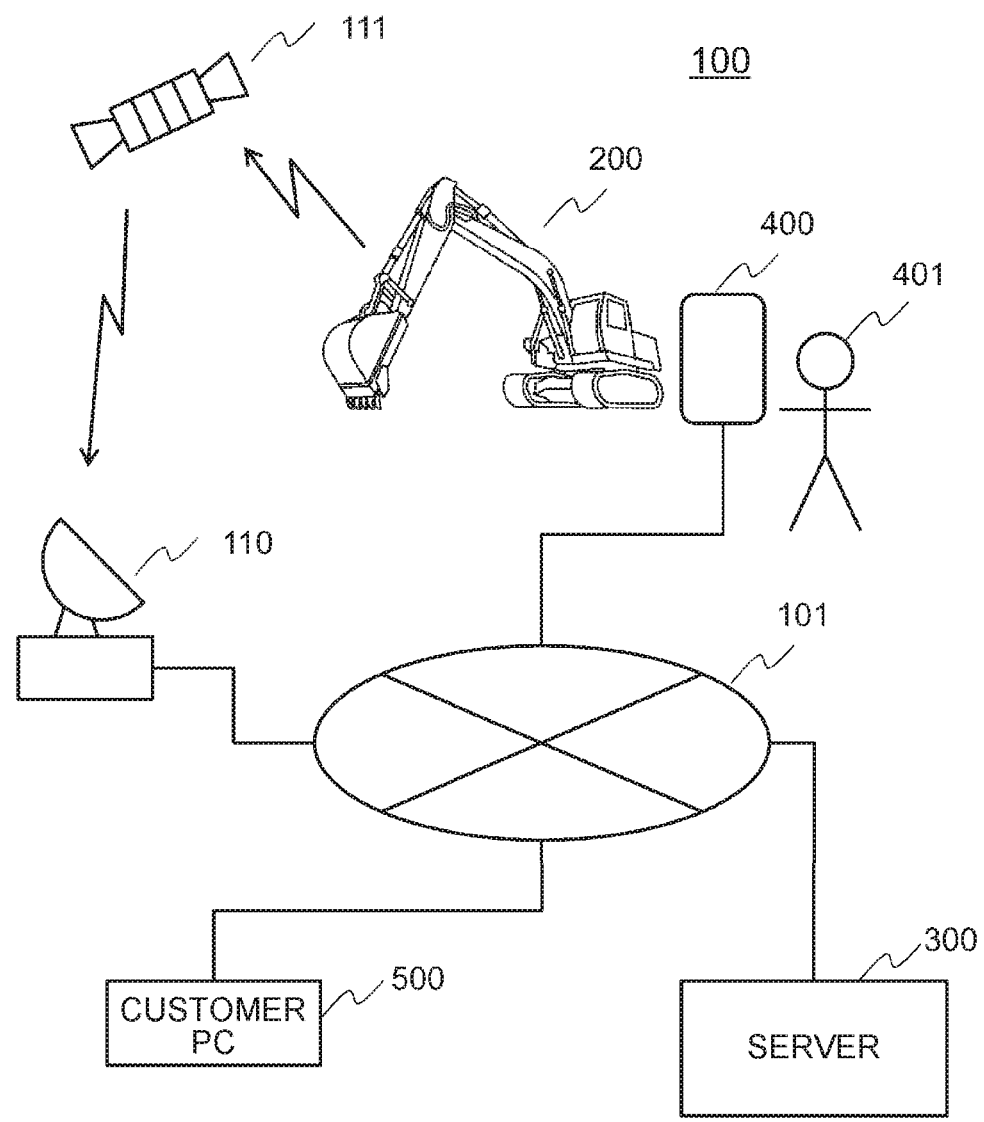
FIG. 1 is an overall view of a management system of a first embodiment.

FIG. 1 is a drawing for explaining an outline of the management system 100 of the present embodiment. In the management system 100 of the present embodiment, one unit or more of hydraulic excavators 200 are managed.

The management system 100 of the present embodiment includes a management server 300, a portable terminal 400, and a customer information processing device (customer PC) 500. The management server 300, the portable terminal 400, and the customer PC 500 are connected to each other through a network 101 such as a public line network for example. Also, the portable terminal 400 is connected to the network 101 through a radio station, a connection device, and the like which are not illustrated.

[Hydraulic Excavator]

The hydraulic excavator 200 of a management object includes a sensor that detects the state of each section as the state data and a controller that transmits the state data detected by the sensor to the management server 300. The state data detected by respective sensors are transmitted to the management server 300 through a communication satellite 111, a base station 110 and the network 101 for example.

Figure 2:
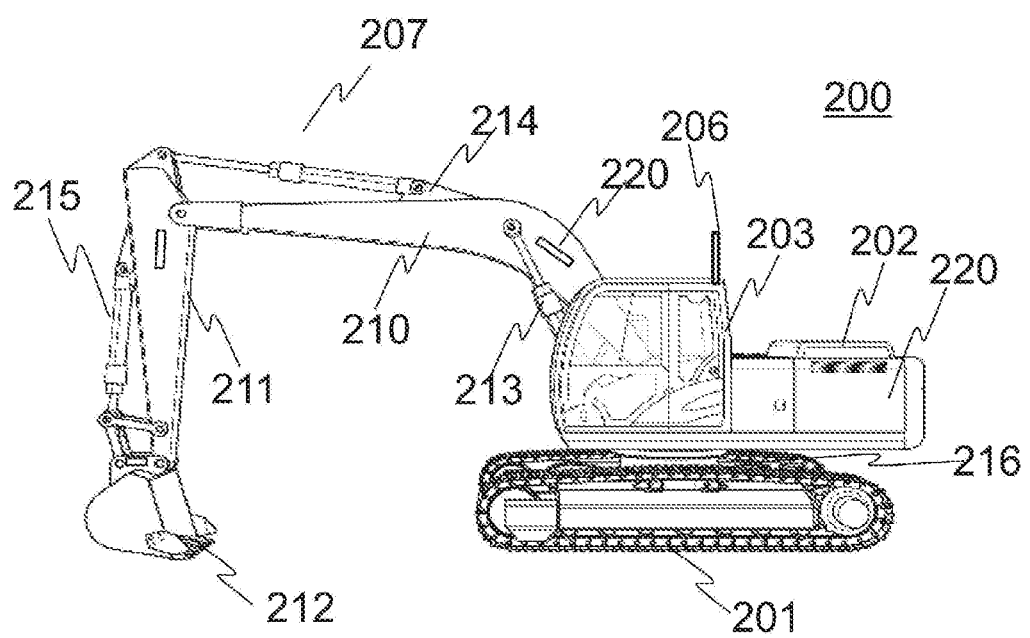
FIG. 2 is an external view of a hydraulic excavator of the first embodiment.

Here, the hydraulic excavator 200 of a management object of the present embodiment will be explained. FIG. 2 is an external view of the hydraulic excavator of the present embodiment.

The hydraulic excavator 200 includes a lower frame 201, a revolving upperstructure 202, a cab 203, a working front 207, and a controller. The lower frame 201 includes a lower travel belt that allows the hydraulic excavator to travel. The revolving upperstructure 202 is turnably attached to the lower frame 201. The working front 207 is vertically and swingably attached to the front portion of the revolving upperstructure 202. The controller controls respective sections.

The working front 207 includes a boom 210, an arm 211, a bucket 212, a boom cylinder 213, an arm cylinder 214, and a bucket cylinder 215. The boom 210 is vertically and swingably attached to the revolving upperstructure 202. The arm 211 is vertically and swingably attached to the distal end of the boom 210. The bucket 212 is vertically and rotatably attached to the distal end of the arm 211. The boom cylinder 213, the arm cylinder 214, and the bucket cylinder 215 are hydraulic cylinders that drive each of them.

Also, to the hydraulic excavator 200, various kinds of sensors 220 group that detect the state of respective sections are attached. As the sensors 220 attached, an inclination sensor, a pressure sensor, an oil temperature sensor, a key sensor, a rotational speed sensor, and so on for example can be cited.

The inclination sensor detects the attitude of the working front 207 for example. Also, the pressure sensor detects the turning operation amount and the traveling operation amount of the revolving upperstructure 202 and the discharge pressure and the like of a pump within the hydraulic drive circuit for example. The oil temperature sensor detects the oil temperature that is the temperature of the hydraulic oil within the hydraulic drive circuit. The key sensor detects ON/OFF of the start/stop switch of the engine. The rotational speed sensor detects the rotational speed of the crankshaft of the engine.

Detected values detected by respective sensors are transmitted to the management server 300 as the state data (operation information) through the controller.

[Potable Terminal]

The portable terminal 400 is carried by a service person 401 at the time of inspection, photographs predetermined inspection positions of the hydraulic excavator 200, and transmits the photographs to the management server 300. In the present description, the portions to be photographed for inspection including an overall image of the hydraulic excavator 200 are hereinafter referred to as the photographing object. FIG. 3A is a hardware block diagram of the portable terminal 400, FIG. 3B is an example of the front surface view of the outer appearance of the portable terminal 400, and FIG. 3C is an example of the back surface (rear surface) view of the outer appearance of the portable terminal 400.

As shown in these drawings, the portable terminal 400 of the present embodiment is an information processing device that includes a CPU 411, a memory 412, a storage device 413, and a communication interface (I/F) 415. Also, a camera 416 is included as a photographing means. Further, a GPS antenna 417 is included as a positional information acquisition means. Furthermore, as a user interface, a display (monitor) 414 is included which displays the process result and the like and receives commands. Also, the portable terminal 400 may be further provided with a communication function and the like.

Respective functions of the portable terminal 400 described below are achieved by that the CPU 411 loads a program stored in the storage device 413 to the memory 412 and executes the program. Also, various kinds of data required for achieving the function such as the data held by a data holding section described below and data generated during processing are stored in the storage device 413 and the like.

Also, as shown in FIG. 3B and FIG. 3C, the display 414 is arranged on the surface of the opposite side of a lens 418 of the camera 416 for example, and functions also as an electronic view finder that visually confirms a photographic subject image photographed by the camera 416. In addition, the lens 418 of the camera 416 may be further arranged also in the same surface of the display 414.

[Management Server]

The management server 300 of the present embodiment manages the state data transmitted from respective hydraulic excavators 200 as operation information, creates a report according to the necessity, and transmits the report to the customer PC 500. Also, in the present embodiment, an inspection report is created based on image data transmitted from the portable terminal 400, and is transmitted to the customer PC 500.

A hardware configuration of the management server 300 achieving this is shown in FIG. 3D. As shown in the present drawing, the management server 300 is an information processing device that includes a CPU 311, a memory 312, a storage device 313, an input/output interface (I/F) 314, and a communication I/F 315.

Respective functions of the management server 300 described below are achieved by that the CPU 311 loads a program held beforehand in the storage device 313 to the memory 312 and executes the program. Various kinds of data required for achieving the function such as the data held by the data holding section described below and data generated during processing are stored in the storage device 313 and the like. Each function is executed at predetermined timing or by a command from a user through the input/output I/F 314. Also, data are transmitted/received to/from an external device through the communication I/F 315.

[Management Server/Portable Terminal]

Next, the function of the management server 300 and the portable terminal 400 related to the inspection report creation portion out of the management system 100 will be explained. In the present embodiment, the portable terminal 400 installs beforehand an application (inspection application) for acquiring information for creating the inspection report, and achieves an inspection support system that acquires required information according to the inspection application and the provided guidance data. Also, the acquired information is transmitted (uploaded) to the management server 300 as the inspection data. Further, the management server 300 having received the information creates an inspection report using the inspection data having been received.

Figure 4:
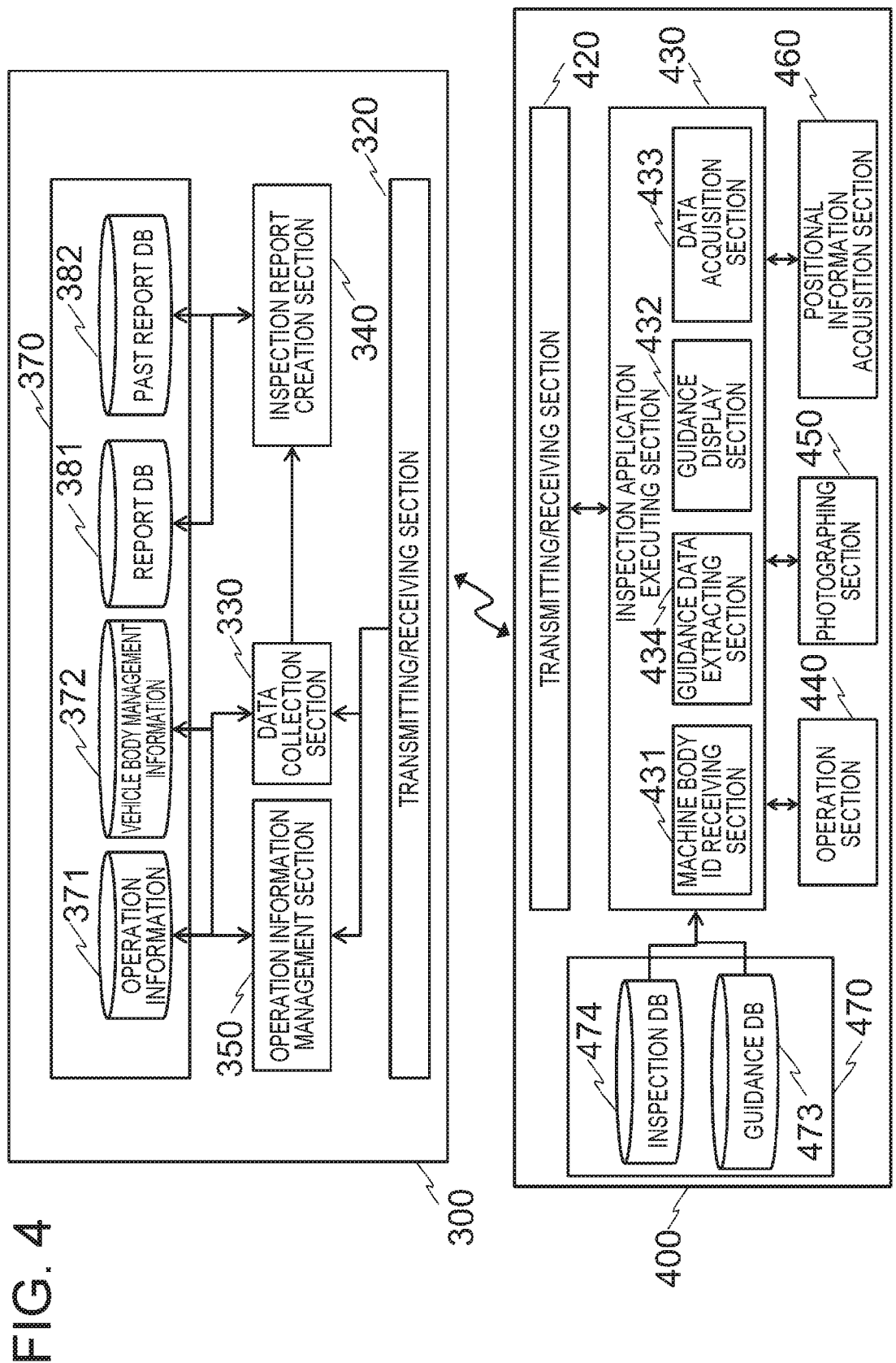
FIG. 4 is a functional block diagram of the management server and the portable terminal of the first embodiment.

The management server 300 and the portable terminal 400 achieving them will be explained. FIG. 4 is a functional block diagram for achieving the function described above of the management server 300 and the portable terminal 400.

The management server 300 includes a transmitting/receiving section 320, a data collection section 330, an inspection report creation section 340, an operation information management section 350, and a data holding section 370.

The transmitting/receiving section 320 transmits/receives data to/from an external device through the network 101. In the present embodiment, the data are transmitted/received to/from the portable terminal 400. Also, the transmitting/receiving section 320 receives sensor information from the respective hydraulic excavators 200, and holds the sensor information in the data holding section 370 as operation information 371 described below. The transmitting/receiving section 320 is achieved by the communication I/F 315.

The data collection section 330 collects inspection data that are transmitted from the portable terminal 400.

The inspection report creation section 340 creates an inspection report based on the inspection data collected by the data collection section 330. At this time, various kinds of data held by the data holding section 370 are used. The detail of the data held by the data holding section 370 will be described below. Also, the inspection report having been created is held in a past report DB described below, and is transmitted to the customer PC 500.

The operation information management section 350 monitors operation information described below, and sets an alarm flag when data deviating from a predetermined range are generated.

Meanwhile, the portable terminal 400 includes a transmitting/receiving section 420, an inspection application executing section 430, an operation section 440, a photographing section 450, a positional information acquisition section 460, and a data holding section 470.

The transmitting/receiving section 420 transmits/receives data to/from an external device through the network 101. The transmitting/receiving section 420 is achieved by the communication I/F 415. In the present embodiment, the inspection application, the guidance data, and the like are downloaded from an external server for example, and the inspection data collected according to the inspection application are uploaded to the management server 300. The inspection application, the guidance data, and the like having been downloaded are captured in the storage device 413 and the like.

The operation section 440 receives operation of a user (here, the service person 401) with respect to the portable terminal 400. In the present embodiment, a command is received through the display 414. The operation section 440 receives a command of photographing by the camera 416 for example. Also, an input of various kinds of commands, comments, and the like required at the time of executing the inspection application is received.

The photographing section 450 photographs a photographic subject image (here, a photographing object) by the camera 416, and obtains image data. The photographic subject image photographed by the camera 416 is displayed in a region (finder region) as an electronic view finder of the display 414. In the present embodiment, when a command of photographing is received from the service person 401, the photographic subject image displayed in the finder region of the display 414 at the time point is acquired as the image data.

The positional information acquisition section 460 calculates positional information of the portable terminal 400 from distance measuring satellite data collected by the GPS antenna 417.

The inspection application executing section 430 executes an inspection application. Here, the CPU 411 extracts the inspection application to the memory 412, the inspection application having been installed, and achieves the inspection application. In the present embodiment, the inspection application executing section 430 achieves the functions of a machine body ID receiving section 431, a guidance display section 432, a data acquisition section 433, and a guidance data extracting section 434.

The machine body ID receiving section 431 receives an input of information (machine type and machine body ID) that identifies the machine body of the hydraulic excavator 200 of the inspection object.

The guidance data extracting section 434 extracts guidance data from the data holding section 470 according to the machine type having been received and according to the inspection type having been received. Also, the guidance data include a guidance image, a comment type, and the like as described below. Further, at this time, the guidance data are extracted for the portion of all image data required for creating an inspection report of the inspection of the inspection type in question.

The guidance display section 432 starts up the camera 416, and displays a guidance screen described below on the display 414. Also, the guidance display section 432 displays the guidance image having been extracted by the guidance data extracting section 434 one by one in order in a guidance image display region included in the guidance screen. At this time, the guidance image and the photographic subject image by the camera 416 are synthesized and displayed in the guidance image display region. The detail of the guidance screen will be described below.

When a command of photographing is received from the service person 401, the data acquisition section 433 temporarily captures the photographic subject image displayed on the display 414 at that time point as the image data. For example, the data acquisition section 433 issues a command to the photographing section 450, makes the photographing section 450 acquire the photographic subject image as the image data, and temporarily captures the image data. Also, when an input of a comment is received from the service person 401, the comment is temporarily captured in association with the image data that are displayed in the guidance image display region at the time point. The capturing destination of them is to be the storage device 413 and the like for example.

Also, before the image data are transmitted to the management server 300, the data acquisition section 433 determines whether or not the image data are adequate. Further, the determination here may be only for presence/absence of the image data, and may be simple quality checking. As the simple quality checking, the data acquisition section 433 executes an image matching process between the image data acquired and the guidance image using an image analysis software for example, and determines to be adequate when the degree of agreement of a predetermined level or above is shown. Items for which the degree of agreement is determined in the image matching process are the photographing direction, the photographing size, the contrast, and so on for example.

[Data Holding Section]

Here, data held by the data holding section 370 of the management server 300 and the data holding section 470 of the portable terminal 400 will be explained. In the data holding section 370 of the management server 300, the operation information 371, vehicle body management information 372, report data 381, and a past report database (past report DB) 382 are held. Also, in the data holding section 470 of the portable terminal 400, a guidance database (guidance DB) 473 and an inspection database (inspection DB) 474 are held.

The operation information 371 is the state data transmitted from the hydraulic excavator 200. With respect to the operation information 371, a record is created and held for each machine body and for each transmission timing. In each record, as shown in FIG. 5A, for example, state data 371c are registered for each of a machine body ID 371a that identifies the hydraulic excavator 200 and a transmission time 371b of the state data. The state data 371c registered are the pilot pressure, the pump pressure, the hydraulic oil temperature, the engine rotational speed, the hour meter, and the like for example.

The vehicle body management information 372 includes vehicle body information 375, customer data 376, and maintenance information 377.

The vehicle body information 375 is information with respect to the vehicle body of each hydraulic excavator 200 managed by the management system 100. In each record of the vehicle body information 375, information such as a machine type 375a, a model 375b, a machine serial number 375c, and a vehicle body ID 375d for example is registered as shown in FIG. 5B. The vehicle body ID 375d is the identification number of each hydraulic excavator 200 as described above, and is set uniquely for each vehicle body. A record of the vehicle body information 375 is created for each of the vehicle body ID 375d for example.

The customer data 376 is information peculiar to a customer. In each record of the customer data 376, a customer ID 376a that identifies the customer, a customer name 376b, a using machine body ID 376c, a business type 376d and the like are registered as shown in FIG. 5C for example. The using machine body ID 376c is information that identifies the machine body used by the customer in question, and the vehicle body ID 375d of the vehicle body information 375 is registered.

The maintenance information 377 is a repair history of each vehicle body. In each record of the maintenance information 377, a repair date and time 377b, a repair position 377c, and a repair content 377d are registered for each machine body ID 377a as shown in FIG. 5D for example.

The inspection DB 474 includes a photographing object database (DB) 478 where information (photographing object name) identifying the photographing object written in the inspection report is registered, and an inspection type DB 479 where the inspection type for each portion and each operation information is registered.

The photographing object DB 478 is a database where a photographing object name 478c of each inspection type 478b is registered for each machine type 478a of the hydraulic excavator as shown in FIG. 6A. The photographing object name 478c may be registered in the order of acquisition of the image of the photographing object.

The inspection type 478b includes a periodic inspection, an inspection for each damaged portion, an inspection for each abnormality occurrence position, an inspection for the machine type with a special specification, an inspection according to the business type for which the hydraulic excavator 200 is used, and so on for example.

For example, when the inspection type 478b is "periodic inspection", a nameplate, an image when the hydraulic excavator 200 is viewed from the diagonal front (diagonal front), an image when the hydraulic excavator 200 is viewed from the diagonal rear (diagonal rear), a monitor, an engine, the revolving upperstructure 202, a lower travel belt, a base carrier, the working front 207, an attachment such as the bucket 212 are registered in this order.

Also, when the inspection type 478b is "breaker specification machine inspection" that is determined by the specification, in the photographing object name 478c, a breaker pipe, a breaker body (attachment), a breaker specification exclusive component, and the like are registered. Also, when the inspection type 478b is "industrial waste handling machine inspection" that is determined by the business type of usage, in the photographing object name 478c, around radiator, radiator core section enlargement, and the like are registered. When the inspection type 478b is "pump abnormality", in the photographing object name 478c, sensor section enlargement for detecting the pump discharge pressure, harness to the sensor, and the like are registered. When the inspection type 478b is "hydraulic oil and/or water temperature abnormality", in the photographing object name 478c, around radiator, radiator core section enlargement, and the like are registered.

In the inspection type DB 479, as shown in FIG. 6B, an inspection type 479b according to portion and state data (portion/state data) 479a is registered. The portion/state data 479a correspond to the state data 371c that is set to the alarm flag of the operation information and the repair position 377c of the maintenance information 377. In the present embodiment, the guidance data extracting section 434 is used when the guidance data to be extracted is selected.

As shown in FIG. 7, the guidance DB 473 is a database where a guidance image 473c of each photographing object (photographing object name 473b) and a comment type 473d are registered for each machine type 473a of the hydraulic excavator 200. The guidance image 473c is an image that determines the photographing composition including the direction of the photographing object, the size within the image, and the like. The comment type 473d is a type of the inputted comment that is determined beforehand for each photographing object. The service person 401 can input the comment by selecting the state of the photographing object from the comment type 473d. Also, the guidance image and the like may be held for each model of the hydraulic excavator 200.

Also, the comment type 473d possibly differs according to the inspection type even when the photographing object is same. Therefore, the comment type 473d may be registered in association with each photographing object name 478c of the photographing object DB 478.

In the report data 381, a form of the inspection report is stored. The form of the inspection report may be stored for each inspection type for example. The inspection report creation section 340 creates an inspection report using inspection data collected by the data collection section 330, the form of the inspection report, the operation information 371, and the vehicle body management information 372. An example of the inspection report will be described below.

In the past report DB 382, inspection reports having been created are accumulated. Inspection reports themselves as well as the image data, the comments, and the like used for creating the inspection reports are accumulated.

[Guidance Screen]

Next, a guidance screen displayed on the display 414 of the portable terminal 400 by executing an inspection application will be explained.

An initial guidance screen 620 displayed on the display 414 when the inspection application is started first by the inspection application executing section 430 is shown in FIG. 8A. As shown in the present drawing, the initial guidance screen 620 includes a machine body ID receiving region 621 that receives an input of the inspection type as well as the machine type and the vehicle body ID of the inspection object. Also, the inspection type does not have to be received.

The machine body ID receiving section 431 receives the inspection type, the machine type, and the machine body ID having been inputted from the service person 401 through the machine body ID receiving region 621.

Also, the machine body ID receiving region 621 may directly receive an input of information that determines the inspection type, the machine type, and the machine body ID, or may be configured to hold a list of selectable machine type and machine body ID and to select the machine type and the machine body ID from the list.

Further, it may be configured that the list of the selectable machine type and machine body ID is transmitted from the management server 300. In this case, on the management server 300 side, it is possible for example that transmission of the positional information is received from the portable terminal 400 and the list of the machine type and the machine body ID transmitted is narrowed down. The management system 100 manages positional information of each construction machine of each customer. For example, it is possible that only the machine type and the machine body ID of the construction machine that is positioned within a predetermined range from the positional information of the portable terminal 400 as the center are extracted and are transmitted to the portable terminal 400 as the list.

Next, a guidance screen 610 displayed on the display 414 by the guidance display section 432 will be explained. As shown in FIG. 8B, the guidance screen 610 includes a guidance image display region 611, a photographing command receiving region 612, a guidance image information display region 613, a comment receiving region 614, and a fixed command receiving region 615.

The guidance image display region 611 is a region for displaying a guidance image. Further, as described above, the guidance display section 432 also displays a photographic subject image by the camera 416 in the guidance image display region 611. That is, in the present embodiment, the finder region that is the electronic view finder of the camera 416 is set in the guidance image display region 611. The service person 401 can easily obtain image data of required composition by making the photographic subject image displayed within the guidance image display region 611 match the guidance image and executing photographing at the time of acquisition of the image data. Further, it may be configured that the finder region is set in the entire surface of the display 414, and only the photographic subject image within the guidance image display region is cut and is acquired as the image data.

The photographing command receiving region 612 is a region for receiving a photographing command. When the photographing command is received through the present region, the photographing section 450 acquires a photographic subject image as the image data, the photographic subject image being displayed in the guidance image display region 611 at the time point.

The guidance image information display region 613 is a region for displaying information of a guidance image that is displayed in the guidance image display region 611. In the present embodiment, the photographing object name 473b is displayed for example.

The comment receiving region 614 receives an input of a comment by the service person 401. The comment may be configured to be selected from the comment type 473d created beforehand for example, or may be configured that the service person 401 can freely input the comment. Inputting is executed using a text inputting function of the portable terminal 400. Also, the comment type 473d is provided beforehand as guidance data in association with the guidance image 473c displayed in the guidance image display region 611. Further, it is also possible to combine selection from the comment type 473d and direct inputting. For example, only when "presence of abnormality" is selected, the content of the abnormality is inputted, and so on.

The fixed command receiving region 615 is a region for receiving an intention (fixed command) having finished acquisition of the image data and inputting of the comment. In the present embodiment, when the fixed comment is received through the fixed command receiving region 615, first, the guidance display section 432 determines presence/absence of a guidance image not yet displayed out of the guidance images having been extracted by the guidance data extracting section 434. Then, when there is a guidance image not yet displayed, next guidance image and the photographing object name are displayed in the guidance image display region 611 and the guidance image information display region 613 respectively. Meanwhile, when display of all guidance images having been extracted by the guidance data extracting section 434 has been finished, all of the image data and the like having been acquired are stored once in the data acquisition section 433, and are thereafter transmitted to the management server 300 through the transmitting/receiving section 420 as inspection data.

[Flow of Inspection Support Process]

Figure 9:
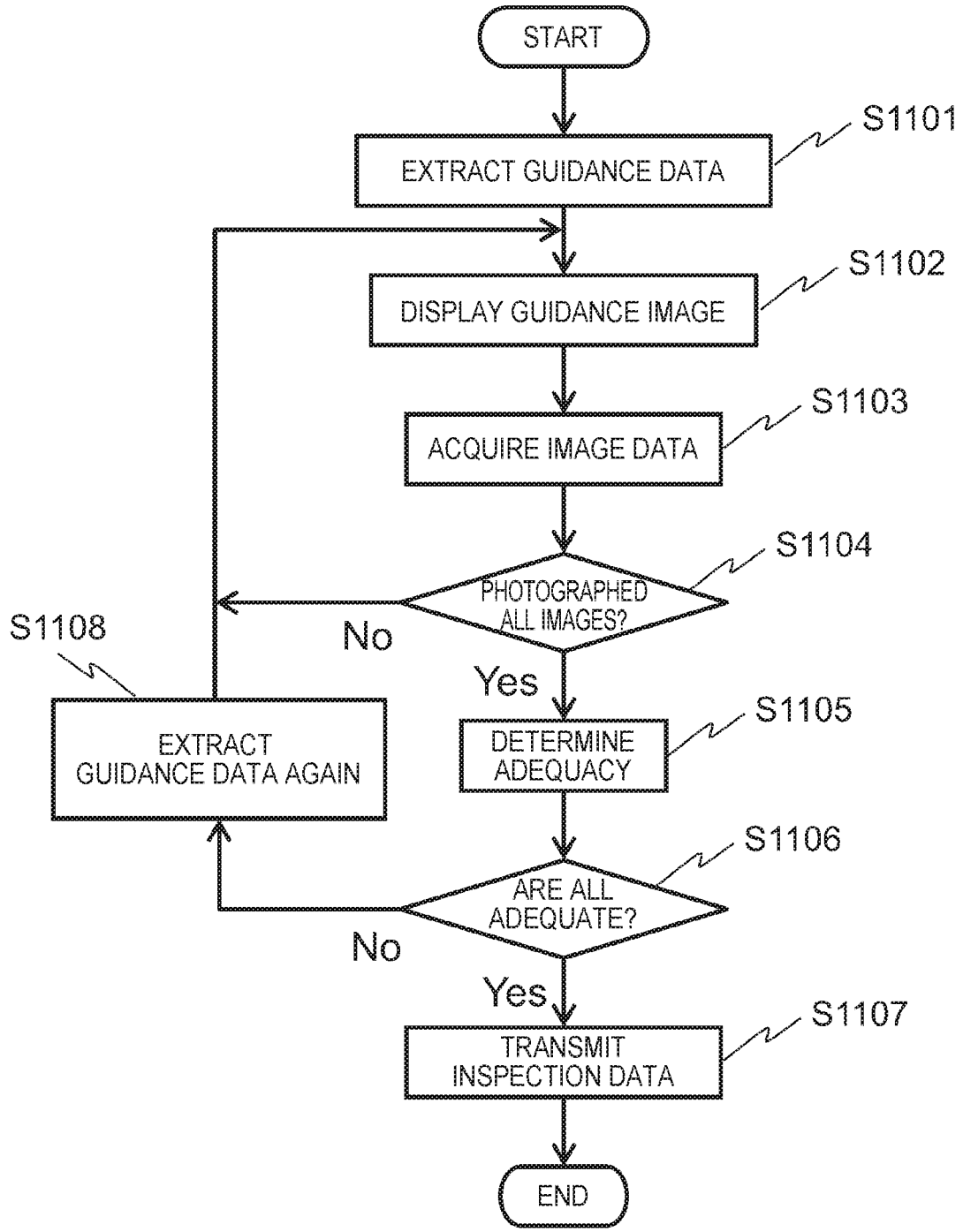
FIG. 9 is a flowchart of an inspection report creation process of the first embodiment.

Next, a flow of an inspection support process by the portable terminal 400 of the present embodiment will be explained. FIG. 9 is a flowchart of an inspection report creation process that is an inspection support process of the present embodiment. The inspection support process of the present embodiment is started by that the service person 401 carries the portable terminal 400, arrives at the vicinity of the hydraulic excavator 200 of the inspection object, and inputs the inspection type, the machine body ID, and the like to the initial guidance screen 620 of the portable terminal 400.

When an input of the inspection type, the machine body ID, and the like is received through the machine body ID receiving section 431, the guidance data extracting section 434 extracts guidance data (step S1101). The detail of the guidance data extraction process will be explained below.

The guidance display section 432 displays one sheet of a guidance image in the guidance image display region 611 of the guidance screen 610 (step S1102). At this time, the guidance display section 432 starts up the camera 416, and displays a photographic subject image in the guidance image display region 611.

When a command for photographing is received from the service person 401, the data acquisition section 433 makes the photographing section 450 execute photographing, and obtains image data (step S1103). The image data acquired here are the photographic subject image that has been displayed in the guidance image display region 611.

Also, when a fixed command is received, the data acquisition section 433 temporarily stores the image data having been acquired in the storage device 413 and the like. At this time, the image data are stored in association with the photographing portion name of the guidance image that is displayed in the guidance image display region 611. Also, when a comment is inputted, the data acquisition section 433 stores the comment as well in association with the photographing portion name.

The data acquisition section 433 determines presence/absence of the next guidance image (step S1104). When there is next guidance image, the process returns to step S1102, and the process is repeated.

Meanwhile, when there is no next guidance image namely when photographing of all images has been finished (step S1104), the data acquisition section 433 determines whether or not respective image data having been acquired are adequate by the method described above (step S1105).

When all image data have been determined to be adequate (step S1106), the data acquisition section 433 transmits all image data and comments having been stored to the management server 300 as inspection data (step S1107). Also, on the management server 300 side, when the image data and the comments have been received, the inspection report creation section 340 creates an inspection report using the inspection data having been transmitted.

Meanwhile, when there are image data that have been determined to be inadequate, the data acquisition section 433 notifies the guidance data extracting section 434 of the event in step S1106. Also, the guidance data extracting section 434 extracts again guidance data corresponding to the image data in question (step S1108), returns to step S1102, and repeats the process.

Figure 10:
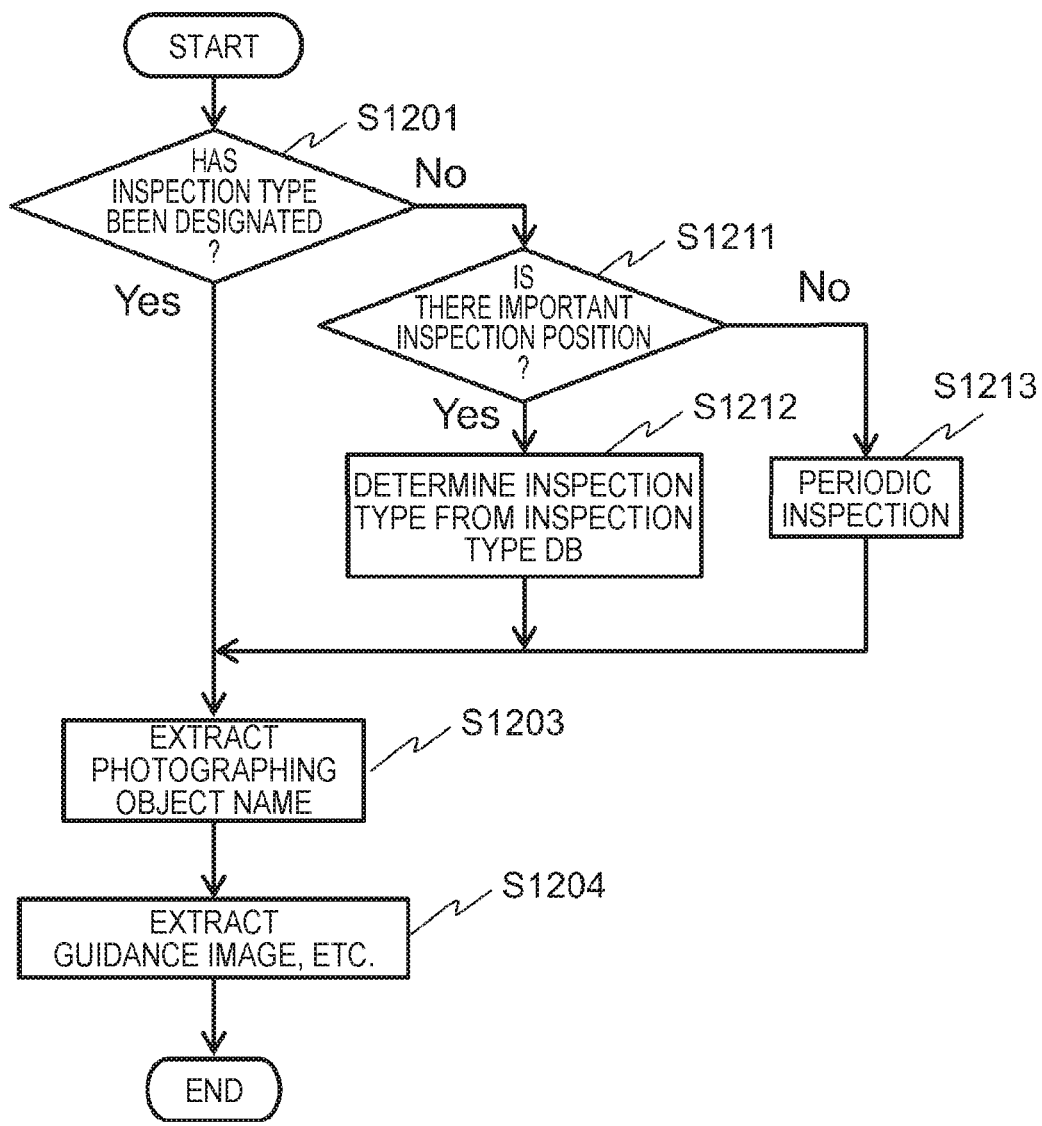
FIG. 10 is a flowchart of a guidance data creation process of the first embodiment.

Next, a flow of a guidance data extracting process by the guidance data extracting section 434 of step S1101 will be explained. FIG. 10 is a process flow of a guidance data extracting process of the present embodiment.

First, the guidance data extracting section 434 determines presence/absence of designation of the inspection type (step S1201).

When the inspection type has been designated, referring to the photographing object DB 478, the guidance data extracting section 434 extracts one or more photographing object name 478c which is registered in association with the designated machine type 478a and the designated inspection type 478b (step S1203).

Also, referring to the guidance DB 473, the guidance data extracting section 434 extracts the guidance image 473c and the comment type 473d which are registered in association with each of the photographing object name 473b having been extracted (step S1204), and finishes the process.

Meanwhile, when the inspection type has not been designated in step S1201, first, the guidance data extracting section 434 determines whether or not there is an important inspection position (step S1211). Here, the guidance data extracting section 434 gets access to the operation information 371 of the management server 300, and determines whether or not there are state data where abnormal data have occurred. For example, when there are the state data 371c where the operation information management section 350 has set an alarm flag, the guidance data extracting section 434 extracts the state data 371c as an important inspection position. Also, the guidance data extracting section 434 gets access to the maintenance information 377, and determines whether or not there is the repair position 377c which has been registered as the repair history. When there is the repair history in the maintenance information 377, the guidance data extracting section 434 extracts the repair position 377c as an important inspection position. Also, here, the extracted important inspection position is not limited to one position.

Also, when it is determined that there is an important inspection position in step S1211 and the important inspection position is extracted, referring to the inspection type DB 479, the guidance data extracting section 434 specifies the inspection type 479b registered in association with the portion/state data 479a (important inspection position) in question (step S1212). Also, the inspection type determined here is not limited to one. Further, after the inspection type 479b is specified, the guidance data extracting section 434 proceeds the process to step S1203. The processes of S1203 and S1204 are repeated by the portion of the determined inspection types.

Meanwhile, when it is determined that there is no important inspection position in step S1211, the guidance data extracting section 434 makes the inspection type a periodic inspection (step S1213), and proceeds the process to step S1203.

Figure 11:
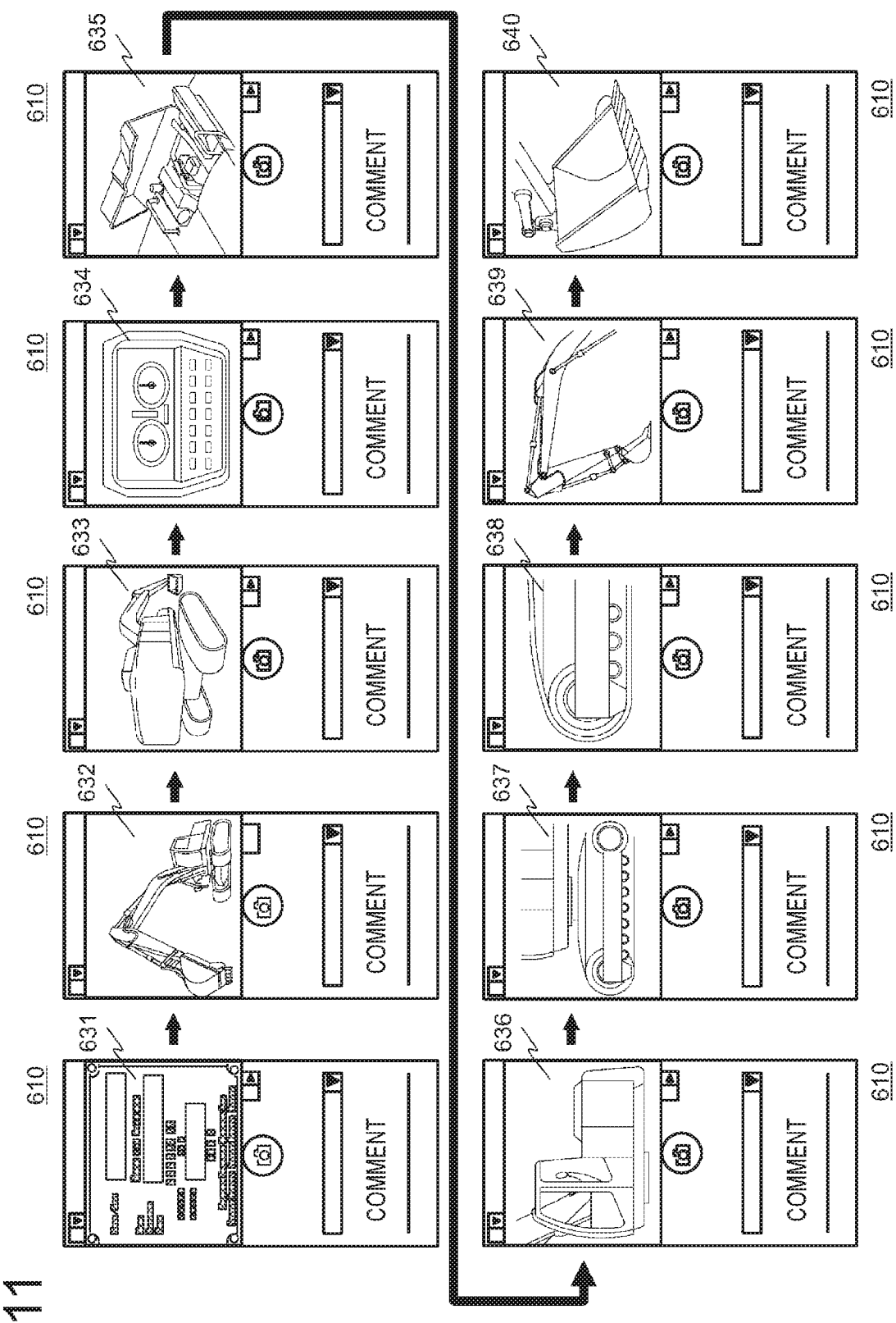
FIG. 11 is an explanatory drawing for explaining a transition of the guidance screen in creating an inspection report of the first embodiment.

Next, the condition of the change (transition) of each process loop of the guidance screen 610 that is displayed on the display 414 in step S1103 of the inspection support process is shown in FIG. 11.

Here, such case is exemplified that the inspection type is made the periodic inspection and the image data are acquired in the order of a nameplate 631, a diagonal front 632 of the vehicle body, a diagonal rear 633 of the vehicle body, a monitor (hour meter) 634, an engine 635, a revolving upperstructure 636, a lower travel belt 637, a base carrier 638, a working front 639, and an attachment 640.

In this case, respective guidance images described above are set in the order described above, and are transmitted to the portable terminal 400 as guidance data. Also, as shown in FIG. 11, the respective guidance images are displayed in the guidance image display region 611 in turn.

Every time a new guidance image is displayed, the service person 401 executes photographing while matching the guidance image displayed in the guidance image display region 611 and the photographic subject image. Also, the service person 401 inputs a comment. Thereafter, the service person 401 inputs a command of finishing photographing through the fixed command receiving region 615.

Figure 12:
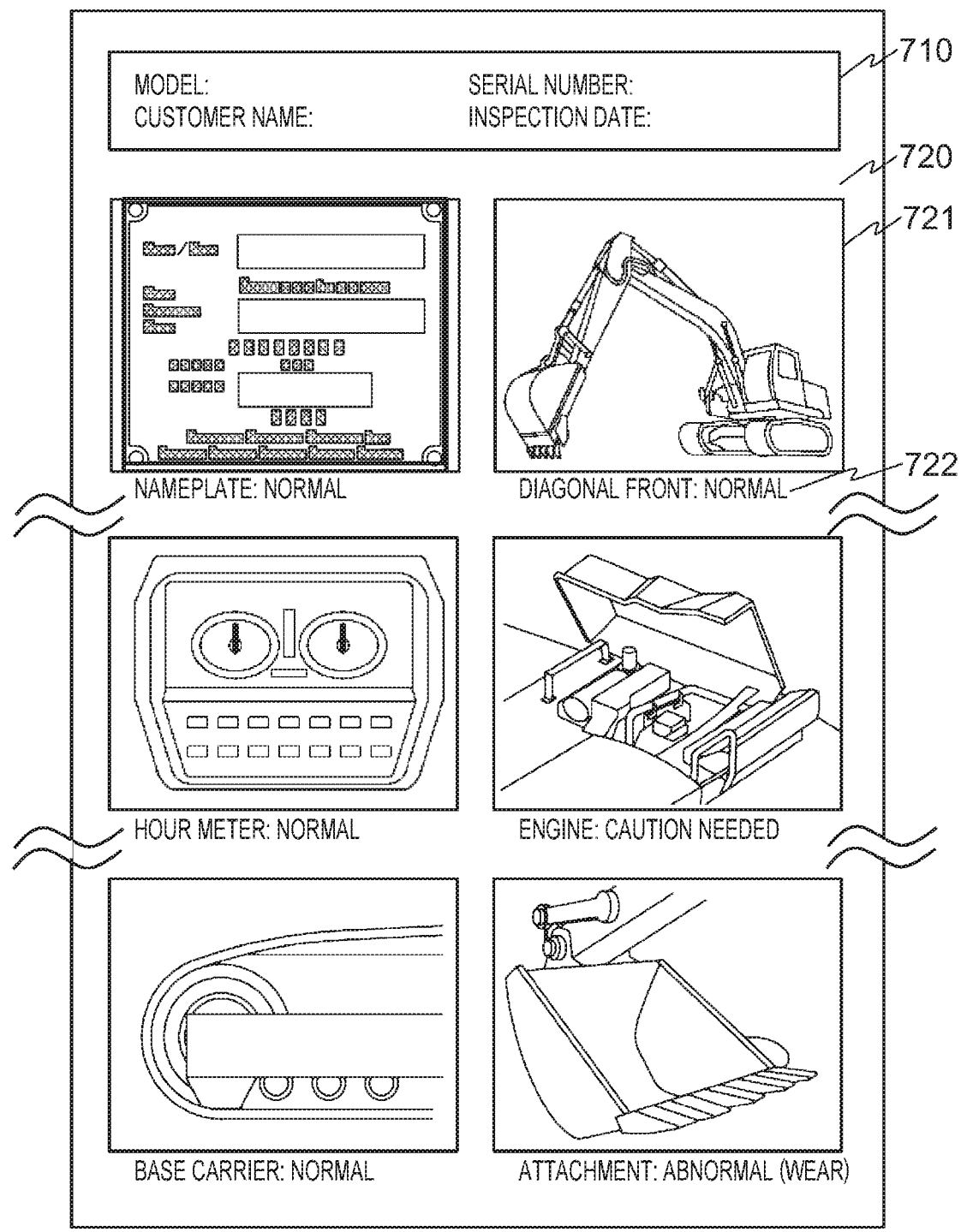
FIG. 12 is an explanatory drawing for explaining an inspection report example of the first embodiment.

An example of an inspection report 700, which is created by the inspection report creation section 340 using the inspection data (the image data and the comment) having been acquired as described above, is shown in FIG. 12.

As shown in the present drawing, the inspection report 700 includes a vehicle body information region 710 and a main body region 720. In the main body region 720, an image data region 721 and a comment region 722 are arranged for each image data.

The inspection report creation section 340 acquires required information from the vehicle body management information 372, and creates the vehicle body information region 710.

Also, the inspection report creation section 340 attaches image data of the inspection data to the image data region 721, the inspection data being collected and stored by the data collection section 330. Further, at this time, the image size, the resolution, and the like may be properly worked and displayed. To the comment region 722, the comment and the photographing portion name having been transmitted along with the image data are inserted.

As described above, according to the present embodiment, a guidance image showing the photographing composition of the photographing object is displayed on the display 414 that serves also as a finder of the camera 416 of the portable terminal 400 that is carried by the service person 401. Therefore, the service person 401 can obtain image data of a desired composition only by executing photographing while matching the guidance image displayed and the photographic subject image.

Also, the guidance image is extracted for the portion of all images required for creating the inspection report, and is displayed. On the display 414, every time one sheet of the image data is acquired, the next guidance image is displayed. Therefore, the service person 401 can obtain all image data required for creating the inspection report only by acquiring the image data matching each guidance image according to the guidance.

Thus, according to the present embodiment, only by executing photographing according to the guidance, the image required for creating an inspection report can be acquired completely with an intended composition. That is, according to the present embodiment, collection of the image data required for creating an inspection report can be supported properly, and the management system 100 of the present embodiment can collect image data having a stable quality irrespective of competence and experience of the service person 401.

Also, according to the present embodiment, an inspection report is created using image data collected by the method described above. Therefore, an inspection report having a stable quality can be created easily irrespective of competence and experience of a service person.

Modification

Also, in the embodiment described above, the portable terminal 400 transmits the image data of all photographing objects altogether from the portable terminal 400. However, the present invention is not limited to this method.

For example, the image data having been acquired may be transmitted to the management server 300 one by one. In this case, the portable terminal 400 confirms adequacy every time the image data are acquired.

Second Modification

Also, in the present embodiment, the inspection report 700 is created using only the inspection data (the image data and the comment) having been transmitted. However, the present invention is not limited to it. For example, the content of the inspection report of the same machine body of the past may be further used.

In this case, the inspection report creation section 340 creates an inspection report using the newest inspection data and inspection data (image data and a comment) of the same photographing object stored in the past report DB 382.

Figure 13:
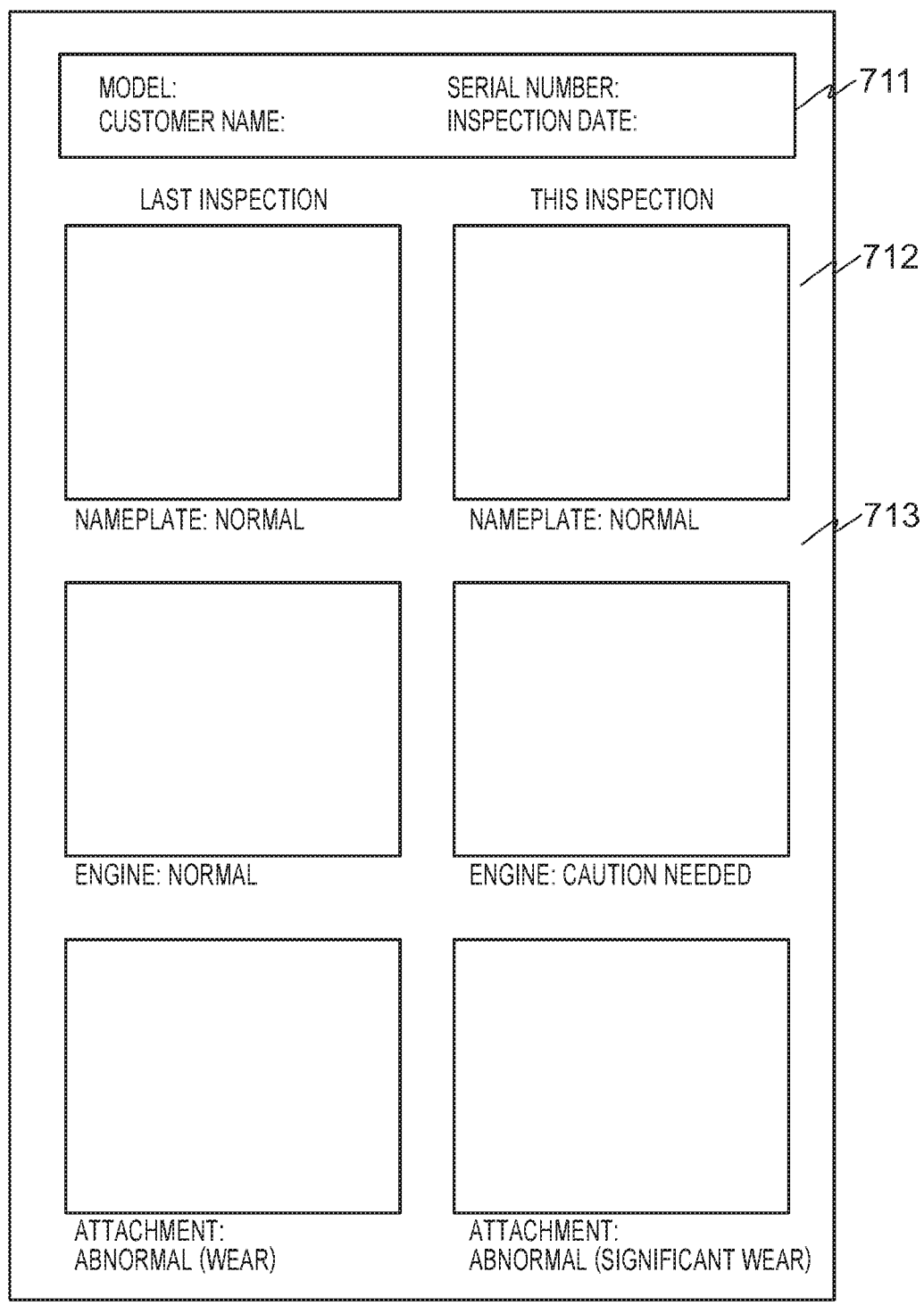
FIG. 13 is an explanatory drawing for explaining an inspection report example of a second modification of the first embodiment.

For example, as an inspection report 700a shown in FIG. 13, with respect to a same photographing object, inspection data of the time of creation of the inspection report of the last time and inspection data transmitted this time are presented in parallel.

Thus, such inspection report can be created which can grasp the temporal change of each photographing object that is the inspection portion.

Second Embodiment

Next, a second embodiment of the present invention will be explained. According to the first embodiment, in the portable terminal 400, only whether or not the acquired image data have a desired quality is determined. However, according to the present embodiment, in the management server 300, the image data having been transmitted are analyzed, and whether or not new inspection is required is determined. Also, when it is determined that new inspection is required, the portable terminal 400 is notified of the event. Hereinafter, the present embodiment will be explained focusing a configuration different from that of the first embodiment.

Figure 14:
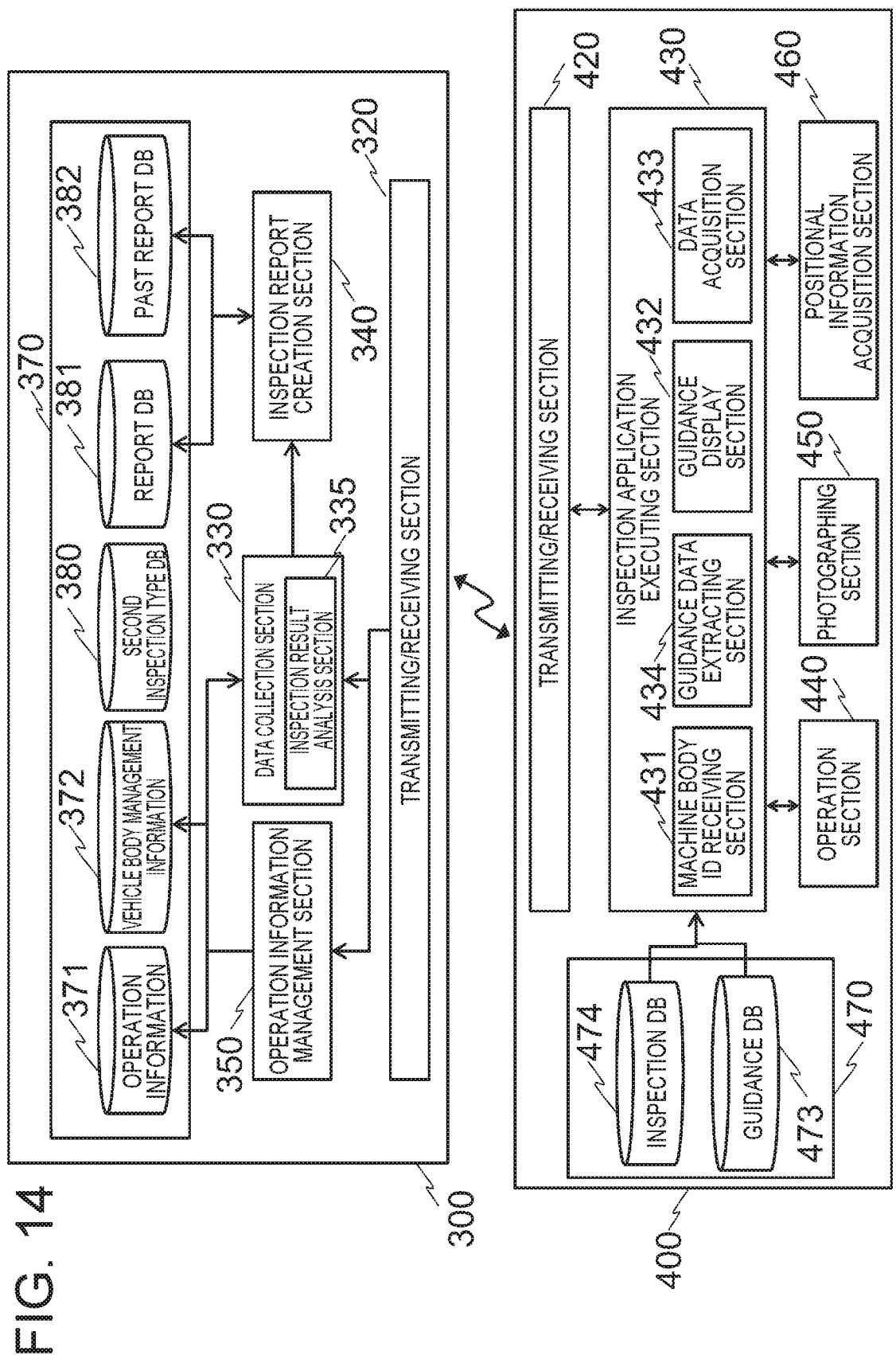
FIG. 14 is a functional block diagram of the management server and the portable terminal of the second embodiment.

In addition to the configuration of the first embodiment, as shown in FIG. 14, with respect to the management server 300 of the present embodiment, the data collection section 330 further includes an inspection result analysis section 335. Also, as shown in FIG. 6C, the data holding section 370 further includes a second inspection type DB 380 for each analysis result 380a, the second inspection type DB 380 storing an inspection type 380b of a case where the inspection is required.

The inspection result analysis section 335 analyzes inspection data acquired and transmitted by the portable terminal 400. For example, the image data are analyzed using existing image analysis software and the like, and presence/absence of a scar, presence/absence of deformation and the like, presence/absence of breakage and so on of the photographing object are determined.

The inspection result analysis section 335 also determines whether or not new inspection is required according to the analysis result. The determination is executed by whether or not the analysis result has been registered in the analysis result 380a of the second inspection type DB 380. That is, when the analysis result has been registered, the inspection result analysis section 335 determines that the new inspection is required. Also, when it is determined that an inspection of a new kind is required, the inspection result analysis section 335 specifies the required inspection type 380b referring to the second inspection type DB 380 and notifies the required inspection type 380b specified to the portable terminal 400.

Further, in the portable terminal 400, when a notification of the inspection type is received from the inspection result analysis section 335, the guidance data extracting section 434 refers to the photographing object DB 478 and the guidance DB 473, and extracts guidance data that are registered in association with the inspection type 478b in question.

A flow of the inspection report creation process that is the inspection support process of this case will be explained using FIG. 15. The inspection support process of the present embodiment is similar to that of the first embodiment up to transmission of the inspection data of step S1107.

When new inspection type is received from the management server 300 within a predetermined time after transmitting the inspection data in step S1107 (step S2101), the process returns to step S1101, and the guidance data extracting section 434 extracts guidance data corresponding to the inspection type in question, and repeats the processes again. Also, the extracting method for the guidance data is similar to that of the first embodiment.

Meanwhile, when new inspection type is not received from the management server 300 within the predetermined time in step S2101, the inspection application executing section 430 finishes the process as it is.

As explained above, according to the present embodiment, similarly to the first embodiment, collection of the image data required for creating an inspection report can be supported properly, and an inspection report having a stable quality can be created irrespective of competence and experience of the service person 401.

Also, according to the inspection result, presence/absence of the additional inspection is determined automatically. In the case where the additional inspection is required, notification is made to the portable terminal 400 to execute an inspection again. Therefore, once the service person 401 goes to a site, all of the required inspections can be covered. That is, it is not required for the service person 401 to visit the site many times. Therefore, according to the present embodiment, an inspection report having a stable quality can be created efficiently.

Further, in the present embodiment also, it may be configured that the guidance image is transmitted one by one.

Furthermore, the inspection report created may be one where inspection data of an inspection report of the past are put down together.

Modification

In each of the embodiments described above, it is configured that the service person 401 inputs the machine type and the vehicle body ID of the inspection object, however the present invention is not limited to it. For example, it is also possible to photograph a photographing portion such as a nameplate which can determine the machine type and the vehicle body ID as described above, and to analyze the photographing result for identification.

Also, when each machine body includes an IC chip where the machine type and the vehicle body ID have been registered, it is also possible for example that the portable terminal 400 executes communication by NFC (Near Field Communication) and the like, reads the machine type and the vehicle body ID within the IC chip, and thereby acquires the machine type and the vehicle body ID.

Further, in each of the embodiments described above, the service person 401 acquires the image data with respect to only a composition that is prepared beforehand as a guidance image, however the present invention is not limited to it. It may be configured also that image data of photographing objects other than that also can be acquired. Further, it may be configured also that a mode of displaying a guidance image and acquiring image data, or a mode of acquiring image data without displaying a guidance image can be selected.

When image data of a composition other than that of the guidance image has been acquired, the service person 401 inputs a photographing object name corresponding to the acquired image data. The data acquisition section 433 transmits the inputted photographing object name along with the image data to the management server 300 through the transmitting/receiving section 420. Also, when image data of a composition other than that of the guidance image has been acquired, the inspection application executing section 430 registers the image data and the photographing object name to the guidance DB 473 and the photographing object DB 478 as a new guidance image. Further, it may be configured also that registration is executed only when the service person 401 determines that the registration is necessary.

Also, in each of the embodiments described above, explanation was made exemplifying a case of providing the data held by the guidance DB 473 and the inspection DB 474 to the portable terminal 400 beforehand along with the inspection application, however the present invention is not limited to this configuration. For example, it may be configured also that these data are held by the management server 300 and are provided according to a request from the portable terminal 400.

REFERENCE SIGNS LIST

100 . . . Management system, 101 . . . Network, 110 . . . Base station, 111 . . . Communication satellite,
200 . . . Hydraulic excavator, 201 . . . Lower frame, 202 . . . Revolving upperstructure, 203 . . . Cab, 207 . . . Working front, 210 . . . Boom, 211 . . . Arm, 212 . . . Bucket, 213 . . . Boom cylinder, 214 . . . Arm cylinder, 215 . . . Bucket cylinder, 220 . . . Sensor,
300 . . . Management server, 311 . . . CPU, 312 . . . Memory, 313 . . . Storage device, 314 . . . Input/output I/F, 315 . . . Communication I/F, 320 . . . Transmitting/ receiving section, 330 ... Data collection section, 335 ... Inspection result analysis section, 340 ... Inspection report creation section, 350 ... Operation information management section,

370 ... Data holding section, 371 ... Operation information, 371*a* ... Machine body ID, 371*b* ... Transmission time, 371*c* ... State data, 372 ... Vehicle body management information, 374 ... Inspection DB, 375 ... Vehicle body information, 375*a* ... Machine type, 375*b* ... Model, 375*c* ... Machine serial number, 375*d* ... Machine body ID, 376 ... Customer data, 376*a* ... Customer ID, 376*b* ... Customer name, 376*c* ... Using machine body ID, 376*d* ... Business type, 377 ... Maintenance information, 377*a* ... Machine body ID, 377*b* ... Repair date and time, 377*c* ... Repair position, 377*d* ... Repair content, 380 ... Second inspection type DB, 380*a* ... Analysis result, 380*b* ... Inspection type, 381 ... Report data, 382 ... Past report DB,

400 ... Portable terminal, 401 ... Service person, 411 ... CPU, 412 ... Memory, 413 ... Storage device, 414 ... Display, 415 ... Communication I/F, 416 ... Camera, 417 ... GPS antenna, 418 ... Lens, 420 ... Transmitting/receiving section, 430 ... Inspection application executing section, 431 ... Machine body ID receiving section, 432 ... Guidance display section, 433 ... Data acquisition section, 434 ... Guidance data extracting section, 440 ... Operation section, 450 ... Photographing section, 460 ... Positional information acquisition section,

470 ... Data holding section, 473 ... Guidance DB, 473*a* ... Machine type, 473*b* ... Photographing object name, 473*c* ... Guidance image, 473*d* ... Comment type, 478 ... Photographing object DB, 478*a* ... Machine type, 478*b* ... Inspection type, 478*c* ... Photographing object name, 479 ... Inspection type DB, 479*a* ... Portion/state data, 479*b* ... Inspection type,

500 ... Customer PC,

610 ... Guidance screen, 611 ... Guidance image display region, 612 ... Photographing command receiving region, 613 ... Guidance image information display region, 614 ... Comment receiving region, 615 ... Fixed command receiving region, 620 ... Initial guidance screen, 621 ... Machine body ID receiving region, 631 ... Nameplate, 632 ... Diagonal front, 633 ... Diagonal rear, 634 ... Monitor, 635 ... Engine, 636 ... Revolving upperstructure, 637 ... Lower travel belt, 638 ... Base carrier, 639 ... Working front, 640 ... Attachment,

700 ... Inspection report, 700*a* ... Inspection report, 710 ... Vehicle body information region, 720 ... Main body region, 721 ... Image data region, 722 ... Comment region

The invention claimed is:

1. An inspection support system for a construction machine comprising:

a camera;

a monitor;

a processor;

a storage device; and a communication interface, wherein the storage device is configured to store:

vehicle body management information received from a management server, the vehicle body management information including machine body identification information of the construction machine in association with a machine type of the construction machine;

a plurality of inspection types, a plurality of machine types, and a plurality of photographing objects, the plurality of inspection types being registered in association with each of the plurality of machine types, and a different set of the plurality of photographing objects being registered for each inspection type of the plurality of inspection types registered in association with each of the plurality of machine types, the plurality of inspection types registered in association with each of the plurality of machine types including a periodic inspection, a specification, a business type and a plurality of inspection types corresponding to a plurality of different abnormality occurrence positions, respectively, of the machine type;

each inspection type corresponding to a different abnormality occurrence position of the machine type being registered in association with one or more different pieces of portion/state data associated with the different abnormality occurrence position;

a plurality of guidance images to be displayed on the monitor, each guidance image being registered in association with a different photographing object of the plurality of photographing objects and in association with a machine type of the plurality of machine types, and the guidance image showing a composition of the different photographing object, the composition including a direction of the different photographing object and a size within an image of the different photographing object; and a program, wherein different pieces of state data of portions of the construction machine are detected by sensors provided in the construction machine and are transmitted from the construction machine to the management server at each of a plurality of predetermined transmission timings, the different pieces of state data of the portions of the construction machine being stored by the management server, and in a case where one or more of the different pieces of state data of the portions of the construction machine are abnormal, an alarm flag is set therein by the management server in association with each of the one or more different pieces of state data, and wherein the processor executes the program to configure the processor to:

receive a designation of the machine body identification information of the construction machine and the machine type of the construction machine;

in a case where one of the plurality of inspection types is designated, extract one of the photographing objects from the set of photographing objects registered in the storage device for an inspection type matching the designated inspection type and in association with a machine type matching the designated machine type;

in a case where none of the inspection types is designated, identify each of the one or more different pieces of state data of the portions of the construction machine having the alarm flag set therein, identify one or more of the plurality of inspection types corresponding to the different abnormality occurrence positions that are registered in association with a machine type matching the designated machine type and that are registered in association with one or more different pieces of portion/state data that correspond to the identified one or more different pieces of state data of the portions of the construction machine having the alarm flag set therein, and extract one of the photographing objects from the set of photographing objects registered in the storage device for one of the one or more identified inspection types corresponding to the different abnormality occurrence positions;

in each case, upon extracting the one of the photographing objects, extract the guidance image registered in the storage device in association with the one of the photographing objects and in association with a machine type matching the designated machine type;

display the guidance image which has been extracted on the monitor; and transmit, to the management server, image data of the one of the photographing objects of the construction machine which has been acquired by the camera in a state where the guidance image is displayed on the monitor.

2. The inspection support system for a construction machine according to claim 1, wherein the management server stores repair histories, each of the repair histories being registered in association with a repair position and with machine body identification information, and the processor executes the program to configure the processor to:

in the case where none of the inspection types is designated, further determine whether at least one of the repair histories is registered in association with machine body identification information matching the machine body identification information which has been received, and in a case where one of the repair histories is registered in association with machine body identification information matching the machine body identification information which has been received, further specify the repair position registered in association with the one of the repair histories;

further identify another one of the inspection types corresponding to the different abnormality occurrence positions, the another one of the inspection types being registered in association with one or more different pieces of portion/state data that correspond to the specified repair position;

extract another one of the photographing objects, the another one of the photographing objects being extracted from a set of photographing objects registered in the storage device for the identified another one of the inspection types;

further extract the guidance image registered in the storage device in association with the extracted another one of the photographing objects and in association with a machine type matching the designated machine type;

further display the guidance image which has been further extracted on the monitor; and transmit, to the management server, image data of the another one of the photographing objects which has been acquired by the camera in a state where the guidance image is further displayed on the monitor.

3. The inspection support system for a construction machine according to claim 1, wherein the management server further includes an inspection type database in which the plurality of inspection types are registered in association with a plurality of analysis results, respectively, the management server analyzes the image data, determines whether or not an additional inspection is required in accordance with an analysis result of the analyzing, and upon determining that the additional inspection is required, specifies an additional inspection type registered in the inspection type database, and the processor executes the program to configure the processor to:

in a case of receiving a notification of the additional inspection type transmitted from the management server, extract one of the photographing objects from a set of photographing objects registered in the storage device for an inspection type matching the additional inspection type.

4. An inspection report creation system for a construction machine, comprising:

a portable terminal equipped with a camera and a monitor; and a management server that creates inspection reports of the construction machine using images acquired by the portable terminal, wherein the portable terminal includes a first processor, a first storage device, and a communication interface, the first storage device is configured to store:

vehicle body management information received from the management server, the vehicle body management information including machine body identification information of the construction machine in association with a machine type of the construction machine;

a plurality of inspection types, a plurality of machine types, and a plurality of photographing objects, the plurality of inspection types being registered in association with each of the plurality of machine types, and a different set of the plurality of photographing objects being registered for each inspection type of the plurality of inspection types registered in association with each of the plurality of machine types, the plurality of inspection types registered in association with each of the plurality of machine types including a periodic inspection, a specification, a business type and a plurality of inspection types corresponding to a plurality of different abnormality occurrence positions, respectively, of the machine type;

each inspection type corresponding to a different abnormality occurrence position of the machine type being registered in association with one or more different pieces of portion/state data associated with the different abnormality occurrence position;

a plurality of guidance images to be displayed on the monitor, each guidance image being registered in association with a different photographing object of the plurality of photographing objects and in association with a machine type of the plurality of machine types, and the guidance image showing a composition of the different photographing object, the composition including a direction of the different photographing object and a size within an image of the different photographing object; and a first program, wherein different pieces of state data of portions of the construction machine are detected by sensors provided in the construction machine and are transmitted from the construction machine to the management server at each of a plurality of predetermined transmission timings, the different pieces of state data of the portions of the construction machine being stored by the management server, and in a case where one or more of the different pieces of state data of the portions of the construction machine are abnormal, an alarm flag is set therein by the management server in association with each of the one or more different pieces of state data, and wherein the first processor executes the first program to configure the first processor to:

receive a designation of the machine body identification information of the construction machine and the machine type of the construction machine;

in a case where one of the plurality of inspection types is designated, extract one of the photographing objects from the set of photographing objects registered in the storage device for an inspection type matching the designated inspection type and in association with a machine type matching the designated machine type;

in a case where none of the inspection types is designated, identify each of the one or more different pieces of state data of the portions of the construction machine having the alarm flag set therein, identify one or more of the plurality of inspection types corresponding to the different abnormality occurrence positions that are registered in association with a machine type matching the designated machine type and that are registered in association with one or more different pieces of portion/state data that correspond to the identified one or more different pieces of state data of the portions of the construction machine having the alarm flag set therein, and extract one of the photographing objects from the set of photographing objects registered in the storage device for one of the one or more identified inspection types corresponding to the different abnormality occurrence positions;

in each case, upon extracting the one of the photographing objects, extract the guidance image registered in the first storage device in association with the one of the photographing objects and in association with a machine type matching the designated machine type;

display the guidance image which has been extracted on the monitor; and transmit, to the management server, image data of the one of the photographing objects of the construction machine which has been acquired by the camera in a state where the guidance image is displayed on the monitor, and wherein the management server includes a second processor, a second storage device, and a communication interface, the second storage device is configured to store a second program and a plurality of additional inspection types, and the second processor executes the second program to configure the second processor to:

analyze the image data transmitted from the portable terminal;

determine whether or not an additional inspection is required in accordance with an analysis result of the analyzing;

upon determining that the additional inspection is required, specify an additional inspection type stored in association with the analysis result of the plurality of additional inspection types stored in the second storage device; and notify the portable terminal of the specified additional inspection type.

5. The inspection report creation system for a construction machine according to claim 4, wherein the second storage device further stores an inspection report of a previous time of the construction machine, and wherein the second processor is configured to create another inspection report using newest image data transmitted from the portable terminal and image data of a same photographing object in the inspection report of the previous time held by the second storage device.

6. The inspection report creation system for a construction machine according to claim 4, wherein the second storage device further includes repair histories, each of the repair histories being registered in association with a repair position and with machine body identification information, and the first processor executes the first program to configure the first processor to:

in the case where none of the inspection types is designated, further determine whether at least one of the repair histories is registered in association with machine body identification information matching the machine body identification information which has been received, and in a case where one of the repair histories is registered in association with machine body identification information matching the machine body identification information which has been received, further specify the repair position registered in association with the one of the repair histories;

further identify another one of the inspection types corresponding to the different abnormality occurrence positions, the another one of the inspection types being registered in the first storage device in association with one or more different pieces of portion/state data that correspond to the specified repair position;

extract another one of the photographing objects, the another one of the photographing objects being extracted from a set of photographing objects registered in the first storage device for the identified another one of the inspection types;

further extract the guidance image registered in the first storage device in association with the extracted another one of the photographing objects and in association with a machine type matching the designated machine type;

further display the guidance image which has been further extracted on the monitor; and transmit, to the management server, image data of the another one of the photographing objects which has been acquired by the camera in a state where the guidance image is further displayed on the monitor.

* * * * *